June 30, 1970  R. L. BENINGER  3,517,482
CONTINUOUS MOTION MECHANICAL VERTICAL COMPRESSION APPARATUS
Filed Nov. 6, 1967  4 Sheets-Sheet 1

INVENTOR
Robert L. Beninger

BY ATTORNEYS

United States Patent Office 3,517,482
Patented June 30, 1970

3,517,482
CONTINUOUS MOTION MECHANICAL VERTICAL
COMPRESSION APPARATUS
Robert L. Beninger, Sheboygan, Wis., assignor to H. G.
Weber and Company, Inc., a corporation of Wisconsin
Filed Nov. 6, 1967, Ser. No. 680,933
Int. Cl. B65b 5/10
U.S. Cl. 53—387
21 Claims

ABSTRACT OF THE DISCLOSURE

Vertical compressor and sealer for loaded cartons, elevating the loaded cartons along a guide frame, one on top of another to compress and seal the cartons. The elevating mechanism is in the form of two laterally spaced vertically extending continuously operating endless conveyors, the chains of which are on the outsides of the vertical guides for the cartons. Each conveyor has a single flight. The two flights are always at the same relative elevation and support and elevate a carton to be deposited on catches on compressing guides, holding the lowermost carton of the stack of cartons from downward movement, as the flights change their direction of travel from an elevating to a return direction. The carton is delivered to the elevating conveyors along a loading ramp disposed above the drive sprockets for the conveyors and through which the conveyors pass. The flights are in the form of rollers coming into engagement with the bottom of a carton, or a separate lift plate supported on the loading ramp, as the flights move upwardly through the loading ramp. The conveyors and flights are guided to move angularly toward each other as they approach the loading ramp, to effect the deceleration of the flights upon kicking up a carton and the acceleration of the flights as the carton is picked up and elevated. The conveyors and guides may be adjusted toward and away from each other, and when a lift plate is used to lift the cartons, the stop for the cartons may be on the lift plate, which may be adjustable in accordance with the length of the cartons compressed and sealed.

SUMMARY AND OBJECTS OF THE INVENTION

Vertical compressor and sealer for loaded cartons, in which continuously movable vertical endless conveyors are guided to be decelerated as they pick up loaded cartons to prevent damage to the cartons and to be accelerated as the cartons are picked up and elevated to support a stack of cartons along vertical guides. The flights of the conveyors may directly engage and lift light cartons. A lift plate guided for vertical movement and elevated and lowered by the conveyor flights may be used to lift and protect the corrugations of heavy cartons. The lift plates are lowered to the loading level by the conveyor flights as they change their directions of travel, and a delay sufficient to load a carton on its lift plate is attained as the flights pass beneath the loading level and move upwardly to the loading level to pick up and elevate a loaded lift plate.

A principal object of the present invention is to provide a novel and improved form of continuously operating elevator, compressor and sealer for cartons and the like, arranged with a view toward increasing the speed of compression and elevating the cartons and reducing the liability of damaging the cartons, as elevated for compression.

Another object of the invention is to provide a simple form of vertical compressor and sealer for cartons and the like, arranged with a view toward adapting the compressor and sealer to various sizes and weights of loaded cartons with a minimum delay as the lengths of the cartons change.

Still another object of the invention is to improve upon the compressors and sealers heretofore in use for compressing and sealing cartons, by utilizing endless single flight continuously travelling conveyor means for picking up the cartons at an intermediate level with a relatively gentle pick up action, and accelerated to elevate the cartons to be gently deposited on the catches of the carton compression guides, in which the loading ramp for the cartons is located between the ends of the conveyor means to give a sufficient time delay to enable a next succeeding carton to be delivered to the loading ramp without interrupting operation of the conveyor as the flights pass beneath the level of the loading ramp, and return to the loading ramp to pick up a carton thereon.

Still another object of the invention is to provide an improved form of vertical elevator and compressor for compressing and sealing loaded cartons, in which two laterally spaced endless conveyors are utilized to pick up and elevate the cartons, each having a single flight extending thereacross movable in the same direction and the same rate of speed, and in which a lift plate at the carton loading station is lifted above the station in a loaded condition and is returned to the station without interruption in travel of the conveyor.

A still further object of the invention is to provide a novel form of vertical elevator and compressor for cartons and the like, utilizing two laterally spaced chain conveyors each having a single flight, in which the flights are always of the same general elevation and move at the same rates of speed and pick up and elevate a loaded lift plate, and in which the lift plate has a back guide thereon positionable in accordance with the length of the cartons, to enable elevation and compression of the cartons without adjusting the positions of the conveyors relative to each other.

These and other objects of the invention will appear from time to time as the following specification proceeds and with reference to the accompanying drawings.

DESCRIPTION OF THE DRAWINGS

FIG. 4 is a diagrammatic end view of the compressor and sealer in order to illustrate certain details of the lift plate and the catch mechanism for the cartons.

DESCRIPTION OF PREFERRED FORM OF INVENTION

Figure 1:
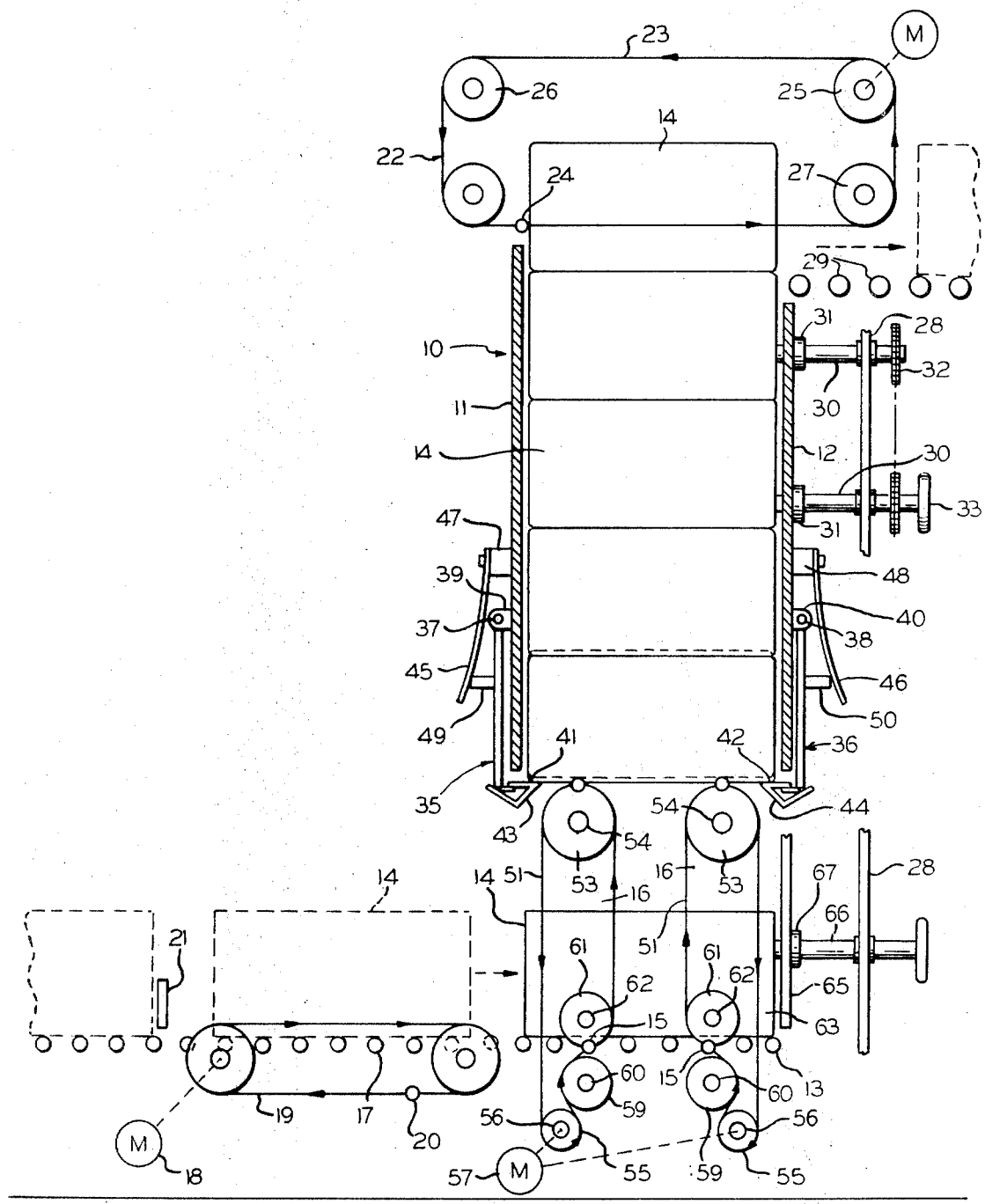
FIG. 1 is a diagrammatic side elevational view, diagrammatically showing one form of vertical compressor and sealer constructed in accordance with the principles of the present invention.

In FIG. 1 of the drawings, I have shown a vertical carton or corrugated box compressing and sealing apparatus 10, in the form of an open vertically extending framework having a pair of parallel spaced vertically extending guide plates 11 and 12 suitably supported above the ground and maintained in the desired spaced relation with respect to each other. The guide plates 11 and 12 are disposed above a loading station 13 for cartons or corrugated boxes 14. The loading station is shown as being in the form of a roller ramp with the rollers thereof spaced sufficiently far apart to accommodate single flights 15 of laterally spaced elevating conveyors 16 to pass therebetween to pick up a carton 14 thereon.

An in-feed roller ramp 17 forms a continuation of the roller ramp 13 and has an in-feed conveyor 19 extending along opposite sides of the roller ramp and driven by a motor 18 in a suitable manner. The conveyor 19 has a roller flight 20 connected therebetween. Timed gating, generally indicated by reference character 21, may be provided to time the delivery of cartons to the in-feed conveyor 19 along the roller ramp 17. This timed gating may be of a conventional form, driven in timed relation with respect to travel of the in-feed conveyor 19 and vertical travel of the flights 15 of the elevating conveyors 16, to deliver cartons to the elevating conveyors in the required sequence, and is no part of the present invention so need not herein be shown or described further.

A flap opener, gluer and closer mechanism (not shown) may also be provided along the roller ramp 17 and in the in-feed conveyor 19, to open and glue the top and bottom flaps of the cartons and to then close the flaps to be sealed in the elevator and compressor 10. The flap opener, gluer and closer mechanism may be of any conventional form and is no part of the present invention so need not herein be shown or described further.

A carton ejector in the form of an endless ejector conveyor 22 is disposed above the guides 11 and 12 and has a pair of parallel spaced endless chains 23 having a single flight 24 connected therebetween. Drive sprockets 25 are provided to drive the endless chains 23. The drive sprocket 25 and rear upper and lower idler sprockets 26 are mounted on through shafts, while lower delivery idler sprockets 27 at the delivery end of the conveyor are mounted on stub shafts, to accommodate the delivery of a box therebetween along a roller delivery ramp 29.

The guide plate 12 is suitably mounted in a frame 28 for adjustable movement toward and from the guide plate 11, and may be adjustably moved toward and from the guide plate 11 in accordance with the length of the boxes being compressed and sealed, by any conventional adjusting mechanism. As shown herein, I have vertically and laterally spaced adjustment screws 30 threaded bosses 31, on the outer side of the guide plate 12 and extending through said threaded bosses and guide plates on the outside of the path of travel of cartons vertically along said guide plates. The adjustment screws 30 may be connected together by an endless chain and sprocket drive 32 and may be adjustably moved by a hand wheel 33 on the outer end of one adjustment screw.

The guide plates 11 and 12 each have a pair of spaced catches 35, 35 and 36, 36 respectively pivotally mounted on the outer sides thereof on pivot pins 37 and 38 respectively. The pivot pins 37 and 38 are mounted at their ends in ears 39 and 40 extending outwardly of the outer sides of the respective guides 11 and 12. The catches 35 and 36 extend beneath the lower ends of the guides 11 and 12 and have inwardly extending ledges 41 and 42 extending inwardly of the respective guides 11 and 12 to engage the bottom of a lowermost carton 14 and hold a stack of cartons between the guides 11 and 12. The ledges at their inner ends terminate into downwardly and outwardly sloping surfaces 43 and 44 respectively, to effect camming of the catches 35 and 36 outwardly by an upwardly traveling carton, to thereby accommodate cartons to pass above said catches. As a carton is elevated above the ledges 41 and 42 of the catches 35 and 36, leaf springs 45 and 46 move the catches inwardly to position the ledges 41 and 42 to be engaged by and support the bottom carton of the stack of cartons as the flights 15 change their directions from the elevating to the return runs of said flights. The leaf springs 45 and 46 are mounted at one end on the guides 11 and 12, in spaced relation with respect to the outer sides thereof, on bosses 47 and 48 respectively and engage lugs 49 and 50 extending outwardly of the respective catches 35 and 36.

The vertical elevating conveyors 16 each include two pairs of parallel spaced endless chains 51 spaced outside of the vertical path of travel of the cartons to the guide plates 11 and 12. Each pair of endless chains 51 has a roller flight 15 extending thereacross and suitably connected to said chains at its opposite ends. The roller flights 15 move at the same rates of speed and are always at the same elevations, to lift a box from the roller ramp 13 in a level condition, and elevate the box in position to be gently deposited on the ledges 41 and 42 of the catches 35 and 36.

As is diagrammatically shown in FIG. 1, the elevating runs of the endless chains 51 pass upwardly to and about direction changing idler sprockets 53 on stub shafts 54. The idler sprockets 53 are at a sufficient elevation to effect the movement of a carton 14 above the ledges 41 and 42 as the flights 15, 15 pass about said idler sprockets, and are of sufficient diameter to gently lower the cartons onto the ledges 41 and 42 as the flights turn about the sprockets 53 and travel on their return runs to drive sprockets 55, 55. The drive sprockets 55, 55 are mounted on through shafts 56 driven from a motor 57, in a conventional manner. From the drive sprockets 55, 55 the chains 51, 51 pass about the idler sprockets 59 on through shafts 60. The idler sprockets 59, 59 are of a relatively large diameter and are disposed just beneath the roller ramp 13 and cooperate with vertically spaced idler sprockets 61, 61 on stub shafts 62, 62 disposed above the roller ramp 13. The idler sprockets 61, 61 are shown as being of substantially the same diameter as the idler sprockets 59, 59 and cooperate with said idler sprockets to effect lateral movement of the flights 15, 15 inwardly toward each other at a decelerated rate of speed prior to picking up a carton 63 from the roller ramp 13. The flights 15 upon picking up a carton are then accelerated as they pass about the idler sprockets 61, 61 to elevate the carton above the ledges 41 and 42 of the catches 35 and 36, to lift the stack of cartons between the guide plates 11 and 12, for the compression and sealing thereof.

The right hand endless chain 51 of FIG. 1 and its drive and direction changing sprockets, as well as a backstop 65 for said endless chain may be adjustably moved with the adjustable guide 12, to accommodate the flights 15, 15 to pick up and elevate cartons of varying lengths. Any form of adjusting means may be provided for adjustably moving the right hand endless chain 51 toward and from the left hand endless chain 51 together with the backstop 65. As herein shown, an adjustment screw 66 is shown as being threaded in a threaded boss 67, extending outwardly of the backstop 65. The backstop 65 may be suitably guided and connected with the right hand endless chain 51 and its drive and direction changing sprockets, to effect adjustable movement of said endless chain and sprockets with the backstop 65.

The elevator sealer compressor just described is particularly adapted for cartons containing lightweight material, in which the weight of the loaded carton is sufficiently light that the roller flights 15, 15 will not injure the corrugated bottoms of the cartons.

In FIGS. 2 through 5, I have shown a lift plate 70 for use with relatively heavily loaded cartons, to protect the corrugated bottoms of the cartons. In this form of the invention the guide plates, catches and conveyors are the same as the form of the invention shown in FIG. 1, so the same part numbers will be applied to the same parts as were applied in FIG. 1. The lift plate 70, however, takes the place of the roller ramp 13 and is supported at a loading level to be picked up by the flights 15, 15 on spaced supports 71, herein shown as being in the form of angles extending across the frame for the compressor.

While the lift plate 70 may be a single flat plate, particularly where the cartons are all the same size, said lift plate is herein shown as including a base plate 73 having a parallel deck plate 75 mounted thereon and spaced thereabove by spacer collars 76. The deck plate 75 may be secured to said base plate as by flat headed machine screws 77 extending through said spacer collars and threaded in the base plate 73. The deck plate 75 has a reduced portion 78 having a backstop 79 extending upwardly therefrom for limiting travel of the cartons onto said deck plate, in accordance with the size of the cartons and the spacing between the guide plates 11 and 12.

Figure 3:
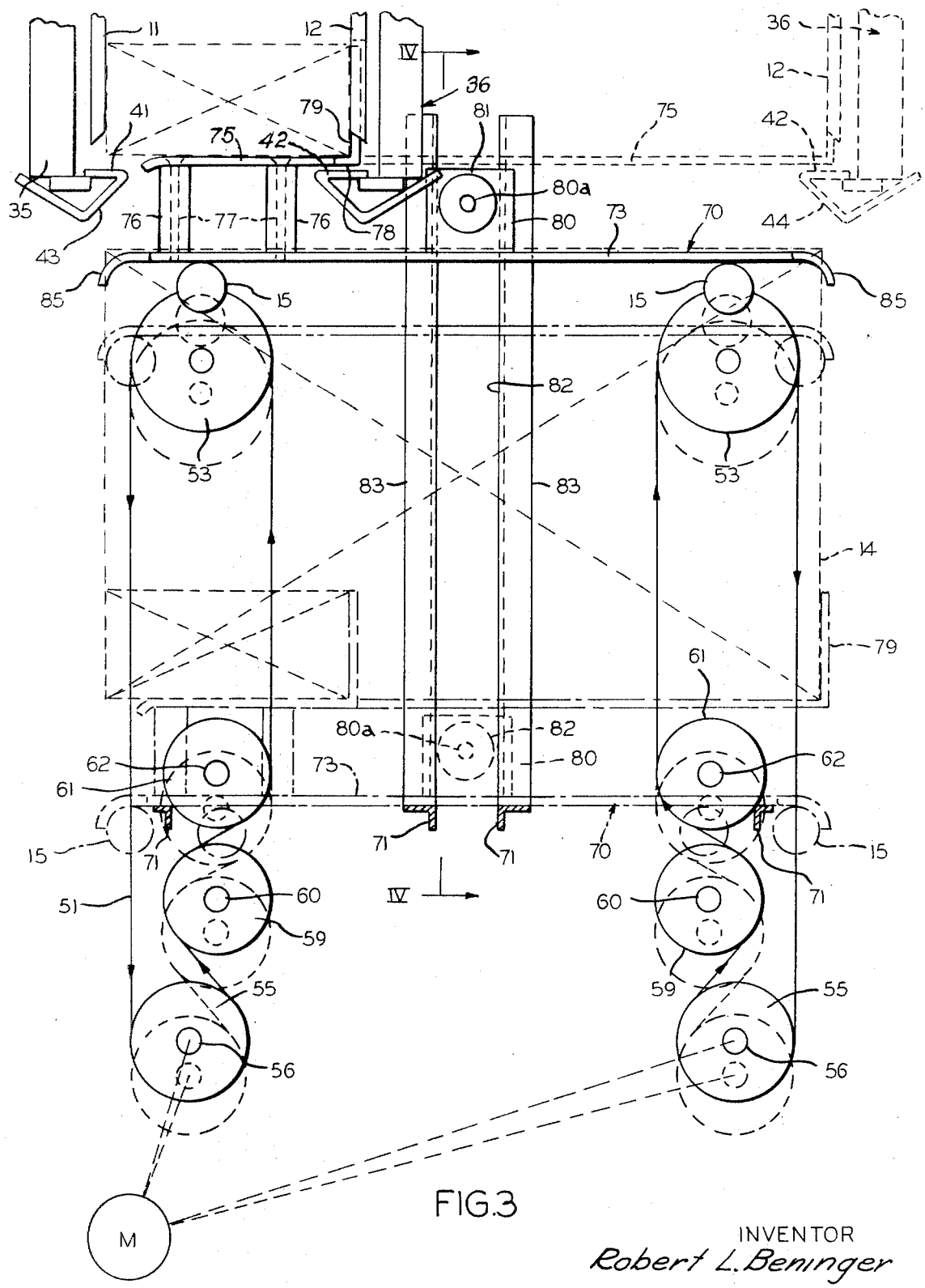
FIG. 3 is an enlarged partial fragmentary diagrammatic side elevational view of the compressor and sealer shown in FIG. 2, showing certain details of the invention not shown in FIG. 2 and showing a modified way in which adjustment of the delivery and loading stations may be attained.

The deck plate 75 may be adjustable in accordance with the length of the carton compressed. As herein shown, however, individual deck plates are provided for each length of carton to be lifted for compression and sealing, and are interchangeably mounted on the base plate 73. FIG. 3 shows a deck plate 75 in solid of a length to elevate a minimum length carton to be deposited on the ledges 41 and 42 of the catches 35 and 36. A deck plate 75 for maximum length cartons is shown by dashed lines in this figure. With such an arrangement it is only necessary to adjust the guides 11 and 12 and interchange deck plates in accordance with the length of the carton to be compressed and sealed, and no adjustment is necessary for the conveyor.

Where a single lift plate is used without the interchangeable deck plates, a backstop (not shown) like the backstop 65 may be provided and the backstop and right hand conveyor 16 may be adjustably moved toward or from the left hand conveyor 16, to correspond to the length of the carton being compressed and sealed, and the spacing between the guides 11 and 12.

Figure 2:
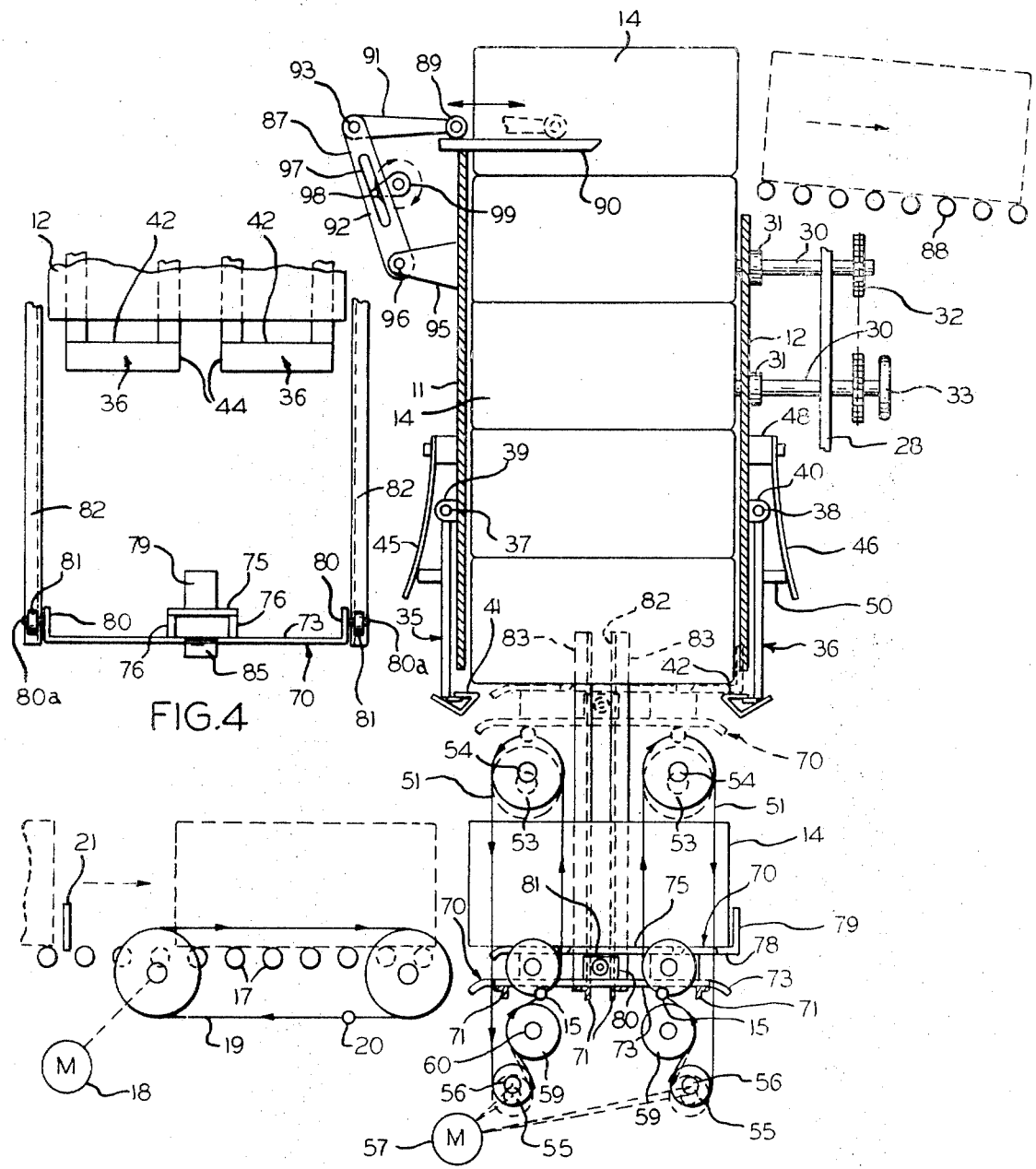
FIG. 2 is a diagrammatic side elevational view like FIG. 1 and diagrammatically illustrating a modified form in which the invention may be embodied.
Figure 5:
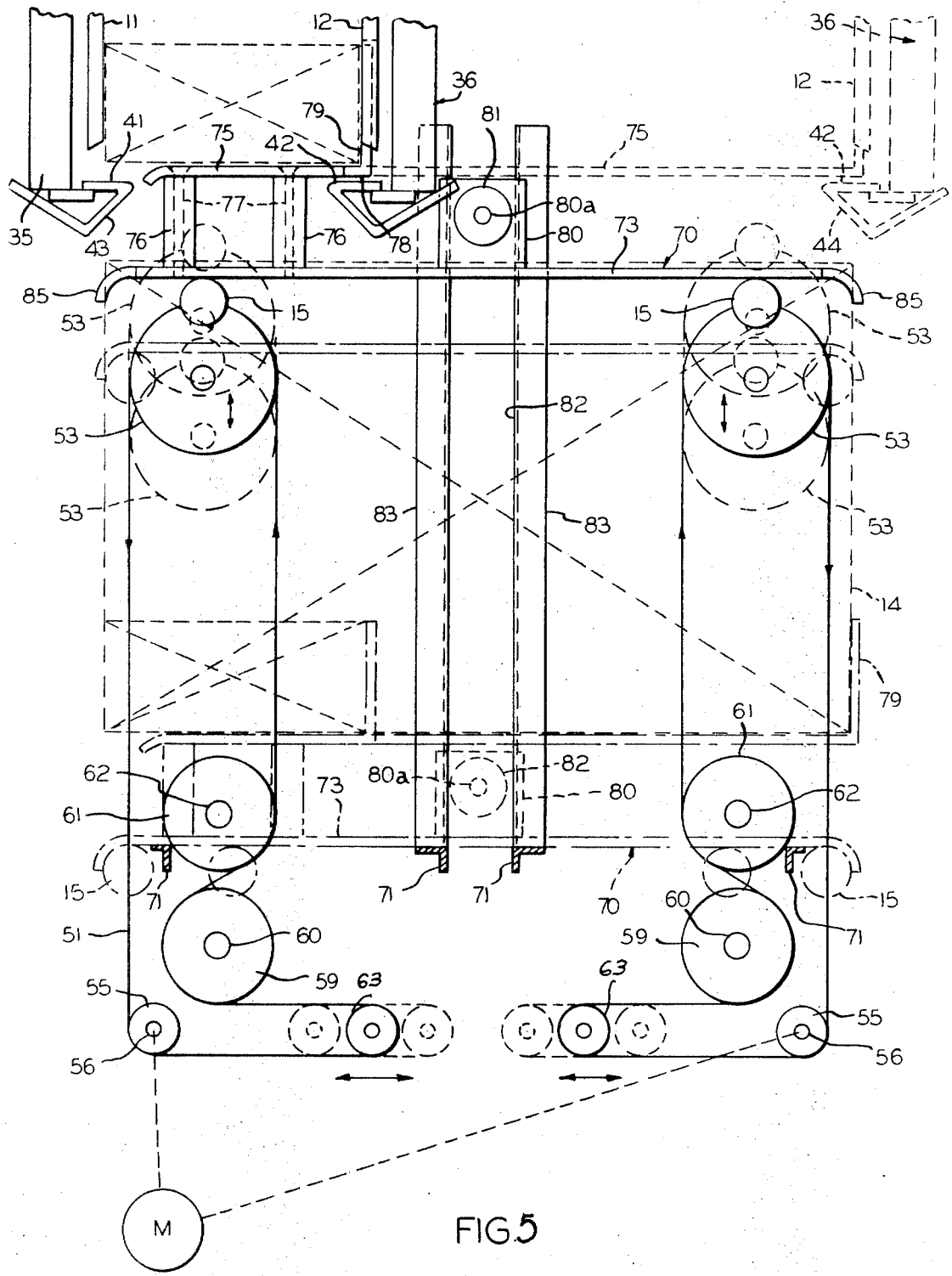
FIG. 5 is a view somewhat similar to FIG. 3, but showing still another way in which adjustment of the delivery and loading stations may be attained.

The base plat 73, as shown in FIGS. 2 and 5, has opposite upturned outer end portions 80, each of which has a roller shaft 80a mounted thereon and extending outwardly therefrom. The roller shafts 80a form bearing supports for anti-friction guide rollers 81, vertically movable along guides 82, formed by parallel spaced angles 83, suitably mounted on the main support structure for the compressor and sealer. The upright end portions 79 of the base plate 73 are of sufficient width to maintain the lift plate in position between the conveyors 16, 16 during elevating and lowering movement thereof and cooperate with the rollers 81, 81 and angles 83, 83 to prevent misalignment of said lift plate during elevating and lowering movement thereof.

The base plate 73 also has downwardly curved tongues 85 extending from opposite ends thereof and curved to generally conform to the forms of the roller flights 15, 15. The undersides of the tongues 85, 85 are engaged by said flights and support the lift plate 70 on said flights during downward travel of said flights.

FIG. 4 shows two sets of spaced apart catches 36 mounted on the guide 12. These catches are spaced apart a distance slightly greater than the width of the reduced portion 78 of the deck plate 75 to accommodate said deck plate to pass thereby. The catches 35, 35 are mounted on the outside of the guide 11 in a similar manner to accommodate a tongue 85 to pass thereby, where the lift plate includes only the base plate 73.

As in the form of the invention illustrated in FIG. 1, the idler rollers 61 and 62 guide the conveyor chains 51 to move inwardly along the bottom of the lift plate 70 at oblique angles with respect to the bottoms of said lift plate, as the roller flights contact the bottom of said lift plate, to pick up said lift plate from the supports 71 with a gentle lifting action. The idlers 61 will then accelerate upward travel of said rollers and effect lifting of said lift plate at the speed of the conveyor chains to the idlers 53. As the flights pass about the rollers 53 they will then move obliquely outwardly with respect to the bottom surface of the lift plate 70 and lift the deck 75 of the lift plate above and then gently lower the carton 14 supported thereon onto the ledges 41 and 42, biased inwardly by the respective leaf springs 45 and 46.

Continued travel of the flights 15 above the idlers 53 and along the down-running runs of the conveyor will lower the lift plate 70 to the supports 71 therefor. The time of passage of the flights 15 downwardly beneath the supports 71, around the drive sprocket 55 and upwardly to again engage the bottom of the lift plate is sufficient to enable a next succeeding carton to be loaded onto said lift plate for elevation, compression and sealing.

In FIG. 2, I have shown an ejector 87 for ejecting cartons from the top of the guide plate 12, to be delivered downwardly along an inclined roller ramp 88. The ejector 87 shown, is particularly adapted for low headroom conditions, heavy cartons, delicate products and higher ejection speeds than the continuous travelling ejector conveyor 22 shown in FIG. 1. As shown in FIG. 2, the ejector 87 comprises a roller 89 extending across the back of a carton 15 and riding at its opposite ends along rails 90 spaced outwardly of the guides 11 and 12 and the path of travel of the cartons therealong. The roller 89 is rotatably mounted on the end of an ejector link 91 pivoted to a lever arm 92, on a pivot pin 93. The lever arm 92 is shown as being pivoted at its lower end between a pair of bracket ears 95 extending outwardly of the guide 11, on the pivot pin 96. The lever arm 92 has a slot 97 extending therealong engaged by a roller 98 on the end of a crank arm 99. The crank arm 99 is rotatably driven by a suitable motor (not shown), in timed relation with respect to elevation of the cartons between the guides 11 and 12 to eject the carton along the roller ramp 88 each time a carton is elevated with its bottom in alignment with the roller ramp 88. The drive mechanism for the crank 99 may be timed and locked into the drive mechanism for elevating the cartons between the guides 11 and 12 in a conventional manner, to effect the successive ejection of cartons as moved vertically into ejecting positions.

In FIGS. 2, 3 and 5 I have generally indicated by dashed lines various manners in which the conveyors may be vertically adjusted. In FIG. 2, for example, the drive sprockets 55 and the upper direction changing idler sprockets 53 may be vertically adjustable through suitable adjusting mechanism (not shown) moving said sprockets "up" or "down" to vary the delivery level "up" or "down." This will result in an increased dwell time with a low delivery level and a decreased dwell time with a high delivery level.

In FIG. 3, the centers of the sprockets 55, 59, 61 and 53 are all connected together in a suitable manner and are all vertically moved together. The in-feed and delivery levels will therefore be varied the same amounts and the dwell time will remain the same in all positions of adjustment of the in-feed and delivery ends of the conveyor.

In the modification of the invention illustrated in FIG. 5, the conveyor chains 51 are driven by sprockets 55 intermediate the ends of the conveyor chains and beneath the idlers 59. The drive sprockets 53 are held from vertical adjustable movement. The lower runs of the conveyor chains 51, however, are shown as trained about take up idlers 63, mounted for horizontal adjustable movement in accordance with adjustment of the delivery idlers 53. The delivery idlers and take up idlers may be independently adjusted in a suitable manner, to maintain the in-feed level very low if required, and to provide a long or short in-feed dwell time as required. This provides a wider range of adjustment than in the other forms of the invention.

In all the manners of adjusting the delivery and in-feed heights of the conveyors just described, any conventional adjusting mechanism may be provided to effect adjustment of the conveyors either manually or by power. The adjustment mechanism is no part of the present invention, so need not herein be described further.

While I have herein shown and described one form in which the invention may be embodied, it may readily be understood that various variations and modifications in the invention may be attained without departing from the spirit and scope of the novel concepts thereof.

I claim as my invention:

1. In a carton compressor and sealer, a vertical frame including
parallel spaced vertical guide members,
catches at the bottoms of said guide members, catching and holding a carton from downward movement and accommodating a carton movable between said guide members to elevate a stack of cartons along said guide members for discharge from the top thereof, the improvement comprising:
means supplying cartons to said guide members and catches, and vertically moving the stack of cartons along said guide members including a loading station disposed beneath said guide members, spaced endless elevator conveyor means disposed beneath said guide members and extending from positions beneath said loading station to positions adjacent said guide members and passing vertically through said loading station.
said endless conveyor means being longitudinally and laterally spaced endless conveyor means and driven in a single direction and each pair of laterally spaced conveyors means having an elevator flight extending thereacross and movable vertically to intercept a carton on said loading station and elevate the carton between said guide members to a position above said catches as they change their directions of travel to their return runs to lower said flights and then gently release the carton to be supported by said catches, and
said flights being at the same level during vertical travel thereof to elevate a carton in a level condition.

2. The structure of claim 1 including:
stop means in association with said loading station to limit the positions of successive cartons moving on said loading station into alignment with said guides, and
wherein the endless elevator conveyor means include direction changing idlers of a relatively large diameter disposed beneath said catches, to position said flights to elevate a carton above said said catches and to move angularly away from a carton when above said catches, to gently release the carton to be supported on said catches, as said flights travel thereabout.

3. The structure of claim 2, wherein the spaced endless elevator conveyor means also includes:
direction changing idler sprockets disposed above said loading station, adjacent but beneath said catches,
drive sprockets disposed beneath said loading station, and
a series of idlers training the endless conveyor means and flights associated therewith to move through said loading station angularly inwardly along the bottom of the carton on said loading station prior to elevating the carton, to effect a gentle lifting of the carton from said loading station.

4. The structure of claim 3, wherein the series of idlers comprise:
an idler training the up-going run of the conveyor means outwardly of the periphery of the associated drive sprocket towards the down-going run of the conveyor means and disposed beneath said loading station, and
a second idler disposed above said first idler and extending above the plane of said loading station and training the up-going run of the conveyor means angularly inwardly along said loading station along the bottom of the carton thereon to effect a gentle pick up of the carton on said loading station and an elevation of the carton to said guides at an accelerated speed.

5. The structure of claim 3 wherein the drive and direction changing idler sprockets are vertically adjustable to adjust the delivery height of the conveyor means and to vary the dwell time as the flights pass downwardly beneath said loading station and upwardly through said loading station to engage the bottom of a carton.

6. The structure of claim 4 wherein said direction changing idler sprockets, said drive sprockets and said first and second idlers are vertically adjustable together to vary the elevation of said loading station and the delivery height of the conveyor means without varying the dwell time.

7. The structure of claim 3:
wherein the direction changing idler sprockets are vertically adjustable to adjust the delivery height of the conveyor means,
wherein the drive sprockets are fixed from vertical adjustable movement, and
wherein take up idlers mesh with said endless conveyor chains and accommodate vertical adjustment of said direction changing idler sprockets, without changing the positions of adjustment of said drive sprockets.

8. The structure of claim 3:
wherein means are provided for adjusting said guides toward and from each other, and
wherein other means are provided for adjusting said stop and the conveyor means associated therewith in accordance with the spacing between said guides.

9. The structure of claim 4:
wherein the loading station includes support means and a lift plate supported on said support means and lifted from said support means by said flights, and
wherein second guides are disposed along opposite sides of said lift plate and maintain said lift plate in position on said flights.

10. The structure of claim 1:
wherein the loading station includes support means and a lift plate supported on said support means for receiving a carton delivered thereto,
wherein the flights passing upwardly through said support means engage said lift plate along the bottom thereof and lift said plate and the carton thereon in to the space between said guides, and return said lift plate as said flights pass about the direction changing idlers disposed adjacent said guides, depositing said lift plate on said support means at said loading station, and effecting delay in time of lifting said lift plate sufficient to deposit a loaded carton thereon, during passage of said flights beneath said support means to the limit of downward travel thereof, and upwardly into engagement with the bottom of said lift plate.

11. The structure of claim 10:
wherein the lift plate has a stop thereon positioning a carton deposited thereon in direct alignment with said guides, and
wherein second guides are disposed along opposite sides of the lift plate and maintain said lift plate in position on said flights.

12. The structure of claim 10 wherein a pair of vertically spaced idlers are provided for each of said conveyor means for guiding said conveyor means and the flights thereon to move angularly inwardly towards each other along said lift plate, upon coming into engagement therewith, to effect a gentle lifting of said lift plate, and to then accelerate said lift plate and elevate a carton thereon into and along the space between said guides.

13. The structure of claim 10:
wherein second vertically extending guides are disposed outwardly of opposite sides of the path of vertical travel of the cartons beneath said first mentioned guides, and
wherein means are provided to guide said lift plate for movement along said second guides.

14. The structure of claim 13 wherein said lift plate includes:
roller brackets mounted at opposite sides thereof, and
rollers rotatably journalled in said roller brackets for guiding engagement with said guides.

15. The structure of claim 10 wherein the lift plate includes:
a base plate,
a deck plate spaced above said base plate and mounted thereon and forming a support for cartons delivered thereto, and
a stop on said deck plate limiting movement of a carton thereon to a position in alignment with said guides.

16. The structure of claim 15 wherein the stop is located in various positions along said base plate to align cartons of various lengths on said deck plate with said guides.

17. The structure of claim 15 including:
means for adjustably moving one of said first mentioned guides toward and from the other, to space said first mentioned guides apart in accordance with the length of cartons being compressed, and
interchangeable deck plates for mounting on said base plate in accordance with the spacing between said guides.

18. The structure of claim 12:
wherein second vertically extending guides are disposed perpendicularly to said first mentioned guides and outwardly of the path of vertical travel of cartons between said first mentioned guides,
wherein said lift plate has roller brackets mounted at opposite sides thereof,
wherein rollers are supported on said roller brackets for guiding engagement with said guides, and
wherein stop means are provided to position a carton delivered to said lift plate in alignment with said first mentioned guides.

19. The structure of claim 18:
wherein means are provided to adjustably move one of said first mentioned guides towards and from the other, and
wherein other means are provided to adjustably move said stop in accordance with the spacing between said guides.

20. The structure of claim 18 wherein the lift plate includes:
a base plate,
a deck plate spaced above said base plate,
means mounting said deck plate on said base plate in a carton receiving position, and
a stop on said deck plate limiting movement of a carton thereon to a position to pass along said first mentioned guides.

21. The structure of claim 20:
wherein at least the direction changing idler sprockets are vertically adjustable, to adjust the delivery height of the conveying means, and
wherein compensating means are provided to compensate for vertical adjustment of said direction changing idler sprockets.

References Cited

UNITED STATES PATENTS

| | | | |
|---|---|---|---|
| 2,634,001 | 4/1953 | Griffin | 214—6 |
| 3,020,691 | 2/1962 | Oxborrow | 53—376 |
| 3,325,021 | 6/1967 | Burns et al. | 214—6 |

TRAVIS S. McGEHEE, Primary Examiner

U.S. Cl. X.R.

214—6